United States Patent

Shinoda et al.

[15] 3,654,495

[45] Apr. 4, 1972

[54] PULSE PRODUCING CIRCUIT

[72] Inventors: Hajime Shinoda, Tokyo; Takao Tsuchiya, Kanagawa-ken, both of Japan

[73] Assignee: Sony Corporation, Tokyo, Japan

[22] Filed: Mar. 29, 1971

[21] Appl. No.: 128,866

[30] Foreign Application Priority Data

Apr. 2, 1970 Japan ..................................45/28083

[52] U.S. Cl. .......................307/293, 178/69.5 CB, 307/246, 307/268, 328/55, 328/67

[51] Int. Cl. .......................................................H03k 17/28

[58] Field of Search ...................178/69.5 CB; 307/246, 262, 307/268, 293; 328/55, 67

[56] References Cited

UNITED STATES PATENTS 2,329,137 9/1943 Richards..............................328/67 X 3,027,515 3/1962 Clark et al. ..........................328/67 X 3,354,323 11/1967 Dovaihy.............................307/293 X 3,500,067 3/1970 Davis et al. ........................307/268 X

*Primary Examiner*—Donald D. Forrer

*Assistant Examiner*—R. C. Woodbridge

*Attorney*—Lewis H. Eslinger, Alvin Sinderbrand and Curtis, Morris & Safford

[57] ABSTRACT

A transistor circuit for producing delayed pulses includes a transistor normally biased to conduct. An incoming pulse increases conductivity and charges an RC circuit to change the bias condition. The trailing edge of the incoming pulse drives the transistor to cut-off to form the leading edge of the delayed pulse. The lagging edge of the delayed pulse occurs when the RC circuit discharges enough to allow the transistor to return to normal conductivity.

16 Claims, 4 Drawing Figures

INVENTOR.
HAJIME SHINODA
BY TAKAO TSUCHIYA
Lewis H. Eslinger

INVENTOR.
HAJIME SHINODA
BY TAKAO TSUCHIYA
Lewis H. Eslinger

PULSE PRODUCING CIRCUIT

BACKGROUND OF THE INVENTION

1. Field of the Invention

This invention relates generally to circuits for producing a pulse signal, and more particularly to pulse-producing circuits which are supplied with an input pulse signal and produce a delayed output pulse signal formed in response to the input pulse signal.

2. Description of the Prior Art

In a color synchronizing system of the type used in color television receivers a delayed pulse signal is derived from a horizontal synchronizing pulse signal and is used to control a gate circuit to separate a burst color synchronizing signal from the rest of the composite television signal. The burst signal is transmitted shortly after the horizontal synchronizing pulse and is used to control a local oscillator in accordance with the frequency and phase of the burst signal to produce a reference color subcarrier signal. Delayed pulses may be formed by passing the horizontal synchronizing pulses through a delay line or by triggering one-shot multivibrator or other relatively complex pulse-generating circuits. Or they may be formed by combined differentiating and clipping circuits.

All of the foregoing means for generating delayed pulses suffer from complexity, high cost, or inaccuracy. It is therefore one object of this invention to provide a circuit for producing a pulse signal delayed by a predetermined time relative to the input pulse signal.

It is another object of this invention to provide a simplified circuit for producing a delayed pulse signal in response to an input pulse signal supplied to the circuit.

It is still another object of this invention to provide a circuit for producing a delayed pulse signal in response to an input pulse signal supplied thereto, which is suitable for use as an integrated circuit.

It is a further object of this invention to provide a pulse producing circuit which is suitable for producing a pulse signal for use in the extraction of a burst signal from a composite color television signal in a color synchronizing system of a color television receiver.

SUMMARY OF THE INVENTION

The pulse delay circuit of this invention includes a transistor biased to normal conductivity. Part of the bias is obtained from a voltage divider and the other part is obtained by self-biasing through an RC network. The transistor is a load divided into two parts, and there is a switching circuit connected to the junction of the two parts to prevent the voltage at this junction from swinging in the wrong direction in response to the input pulse.

An incoming pulse polarized to increase the conductivity of the transistor charges the RC circuit so that the resultant overall bias at the end of the applied pulse drives the transistor to cut-off and holds it there until the RC circuit discharges to a predetermined level. The voltage at the junction between the two parts of the load would normally swing in the wrong direction in response to the incoming pulse but is prevented from doing so by the switching circuit. As a result the output pulse is substantially uni-directional and is delayed by the duration of the applied pulse.

A typical use for this pulse delay circuit is in a color television receiver in which the delay circuit may be used to separate a color synchronizing burst from the other parts of a composite video signal. The signal is applied to the junction of the two-part load by means of another transistor and a diode normally biased to cut-off by the first transistor. During the delayed pulse the diode is biased to be conductive so as to transmit the burst signal through it to a tuned amplifier, the output of which is substantially free of extraneous impulse signals and includes only the color synchronizing burst.

DESCRIPTION OF THE PREFERRED EMBODIMENTS

Figure 1:
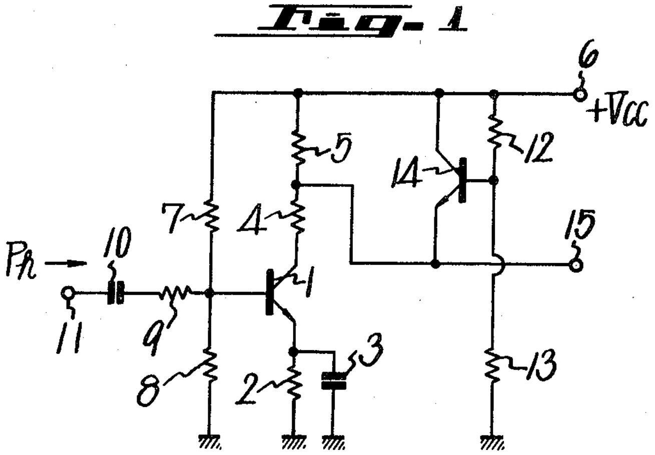
FIG. 1 is a connection diagram showing one example of a pulse producing circuit according to this invention.

The present invention will be described with reference first to FIG. 1. In accordance with the present invention an amplifying transistor 1 is provided, which has its emitter grounded through a parallel circuit consisting of a resistor 2 and a capacitor 3. The collector of the transistor is connected to a power source terminal 6 through load resistors 4 and 5 in series with each other. Resistors 7 and 8 are connected as a voltage divider between the power source terminal 6 and ground. The base of the transistor 1 is connected to the common point between the resistors 7 and 8 to determine the base bias level. The base is also connected through a series circuit consisting of a resistor 9 and a capacitor 10 to an input terminal 11 for an input pulse Ph. The purpose of the resistor 9 is to provide a substantially constant driving current for the transistor 1. In this case, the bias of the transistor 1 is set in its A class operative region.

In addition, another voltage divider comprising resistors 12 and 13 is connected in series between the power source terminal 6 and ground, and the common point of the resistors 12 and 13 is connected to the base of a transistor 14. This transistor is connected as an emitter follower with its collector connected directly to the power source terminal 6 and its emitter connected to the common point of the resistors 4 and 5 and to an output terminal 15. The transistor 14 corresponds in operative effect to the connection of a forward-biased diode and a constant voltage source to the common point of the resistors 4 and 5 as will be described later on.

Figure 2:
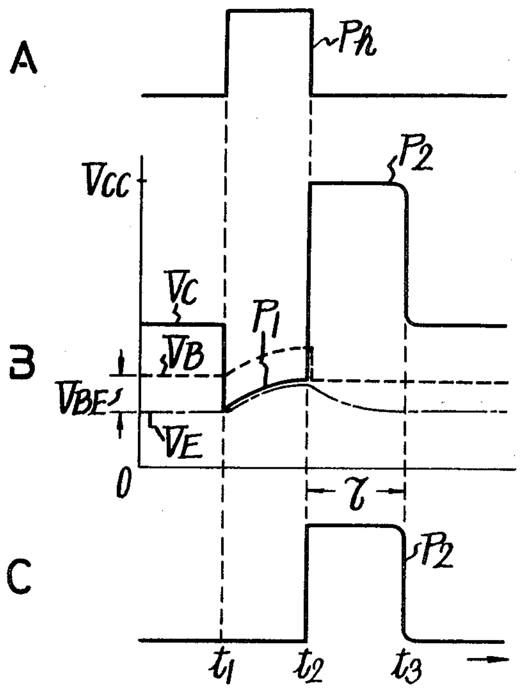
FIG. 2 is a waveform diagram, for explaining the operation of the circuit depicted in FIG. 1.

A description will be given of the operation of the circuit as it would be if the transistor 14 were not connected to the connection point of the resistors 4 and 5. Under such conditions, and in view of the fact that the transistor 1 is in its class A operative region, the collector, base and emitter voltages $V_C$, $V_B$ and $V_E$ of the transistor 1 would be at predetermined values as indicated prior to a time $t_1$ in FIG. 2B. When the leading edge of the input pulse Ph shown in FIG. 2A is applied to the input terminal 11, the conductivity of the transistor 1 is increased and its collector voltage $V_C$ is decreased down to the level of the emitter voltage $V_E$. At the same time, the capacitor 3 charges through the transistor 1 so that the emitter voltage $V_E$ gradually increases and the collector voltage $V_C$ gradually rises in a corresponding manner. The potential difference between the base and the emitter of the transistor 1 is held at a forward drop voltage $V_{BE}$ and so the base voltage $V_B$ also increases to maintain this difference as the capacitor 3 charges up.

At the termination of the input pulse Ph at the time $t_2$, the drop at the trailing edge of this pulse causes the base voltage $V_B$ of the transistor 1 to decrease abruptly to a value determined by the resistor 7 and 8. However, since the capacitor 3 was charged during the time $t_1$ to $t_2$ corresponding to the duration of the input pulse, the voltage between the base and emitter of the transistor 1 becomes lower than the forward drop voltage $V_{BE}$. As a result, the transistor 1 becomes non-conductive and its collector voltage $V_C$ increases up to the level of the power source voltage $V_{CC}$. The capacitor 3 gradually discharges through the resistor 2 at a rate determined by the RC time constant until the voltage between the base and emitter of the transistor 1 becomes equal to the forward drop voltage $V_{BE}$ at a time $t_3$. The interval $\tau$ between the times $t_2$ and $t_3$ is equal to the duration of the delayed pulse $P_2$. The time $t_3$ is determined by the time that the transistor 1 returns to its class A operative condition. At that time the transistor again starts to conduct current that returns the voltage level of the collector of the level $V_C$ that it occupied prior to the occurrence of the input pulse Ph.

Thus there is generated at the collector of the transistor 1 a pulse $P_1$ which is opposite in polarity to the input pulse Ph as indicated by a solid line in the FIG. 2B and a pulse $P_2$ that has a leading edge that coincides with the trailing edge of the pulse Ph and a trailing edge that occurs after an interval $\tau$. If the sum of the resistance values of the resistors 4 and 5 is taken as $R_{45}$ and the values of the resistor 2 and the capacitor 3 are, respectively, taken as $R_2$ and $C_3$, the capacitor 3 is charged with a time constant $C_3R_2R_{45}/(R_2 + R_{45})$ and $\tau$ is nearly equal to $C_3R_2$. Accordingly, the pulse with of the output pulse $P_2$ can be set at a predetermined duration by selecting the values of the resistors 2, 4 and 5 and the capacitor 3.

Figure 3:
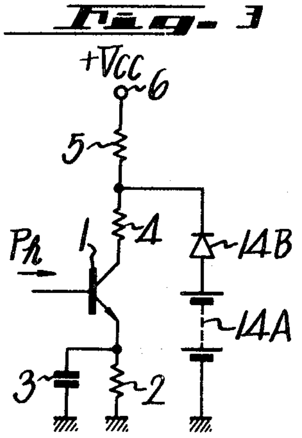
FIG. 3 is an equivalent circuit of one portion of the circuit shown in FIG. 1.

In practice it is preferred that the transistor 14 be connected as shown in the circuit of FIG. 1. Since the transistor 14 is an emitter follower, its output impedance is low and it therefore acts as the equivalent of a constant-voltage power source 14A and a forward-biased diode 14B as shown in FIG. 3. With this addition to the basic circuit, during the period of time from $t_1$ to $t_2$ the collector voltage $V_C$ of the transistor 1 turns on the diode 14B and hence permits a supply of collector current to be carried to the transistor 1 from the power source 14A through the diode 14B. During the period from $t_1$ to $t_2$ the emitter current of the transistor 14 increases and flows into the collector of the transistor 1. As a result of this, the potential at the common junction of the resistors 4 and 5 does not decrease but remains constant in the period $t_1$ to $t_2$ as shown in FIG. 2C. The potential at this common junction rises to the voltage level of the power source $V_{CC}$ as soon as the transistor 1 becomes non-conductive in the period from $t_2$ to $t_3$. This generates the pulse $P_2$ which is derived from the common junction of the resistors 4 and 5 during the interval from $t_2$ to $t_3$. Accordingly, the pulse $P_2$, which is delayed by the duration of the input pulse Ph, is made available at the terminal 15.

Figure 4:
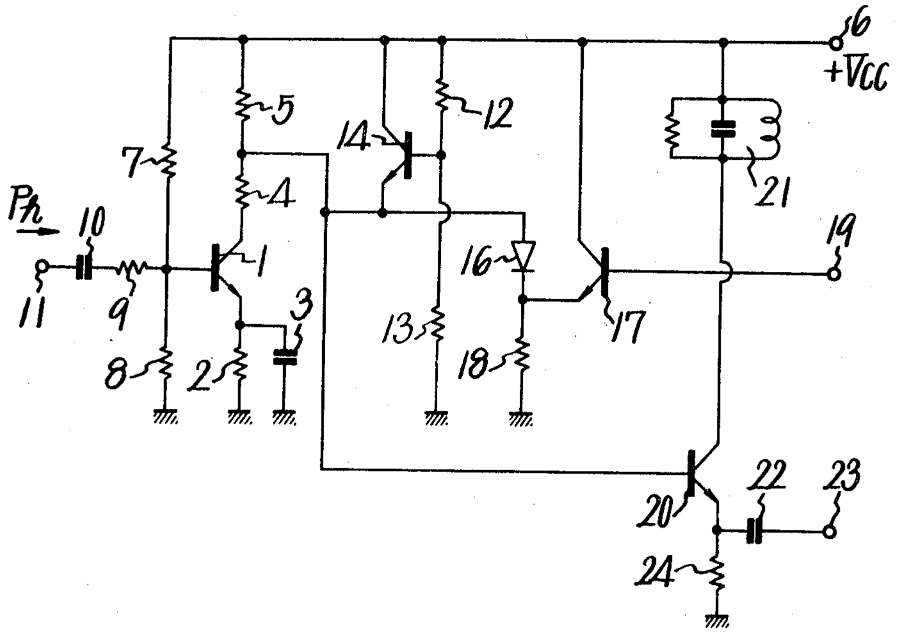
FIG. 4 is a connection diagram illustrating a burst signal extracting circuit for color television receivers according to this invention.

The operation of the delay circuit in separating the color television synchronizing burst in a color television receiver is shown in FIG. 4. In this circuit the emitter of the transistor 14 is connected by a switching diode 16 to the emitter of a transistor 17. The transistor 17 is connected in an emitter follower circuit with its collector connected directly to the power supply terminal 6, its emitter connected to ground through a load resistor 18, and its base connected to a second input terminal 19. The emitter of transistor 14 is also connected to the base of a tuned amplifier comprising a transistor 20 which has its collector connected to the power supply terminal 6 through a parallel resonant circuit 21 tuned to the burst signal frequency. The emitter of the transistor 20 is connected through a capacitor 22 to an output terminal 23. A load resistor 24 is connected between the emitter of the transistor 20 and ground. In this circuit the first input terminal 11 is supplied with the horizontal synchronizing pulse signal Ph as an input pulse signal and the second input terminal 19 is supplied with a composite color television signal that includes the burst signal in the back porch section of the synchronizing part of the signal.

The operation of the circuit in FIG. 4 includes the generation of the pulse signal $P_2$ in the manner described in connection with FIG. 1. In this case the input pulse $P_1$ is the horizontal synchronizing pulse signal Ph that is applied to the input terminal 11. The values of the resistors 2, 4 and 5 and the capacitor 3 are selected so that the pulse width $\tau$ corresponds to the duration of the burst signal. By selecting the emitter potential of the transistor 14 to be somewhat lower than that of the transistor 17 before the time $t_1$ and after $t_3$, when the pulse $P_2$ does not exist, the diode 16 is reverse-biased and therefore is non-conductive. When the pulse $P_2$ is present at the common junction of the resistors 4 and 5 during the interval from $t_2$ to $t_3$, the diode 16 is biased in the forward direction and is therefore conductive. Accordingly, the diode 16 is turned on only for the duration of the burst signal. In this way only the burst signal is supplied from the terminal 19 to the tuned amplifier transistor 20 through the transistor 17 and the diode 16. The burst signal therefore arrives at the output terminal 23 separated from the remainder of the composite color television signal.

With the present invention, the delayed pulse $P_2$ of any desired pulse width can be derived from the pulse Ph as described above by means of the simple circuit of FIG. 1. Since only two capacitors 3 and 10 are employed, the circuit can be readily produced in the form of an integrated circuit. In addition, the circuit provides a simple gate circuit for the burst signal of a composite color television signal.

We claim as our invention

1. A pulse producing circuit comprising a transistor having first, second and third electrodes; means for supplying an input pulse signal to the first electrode of said transistor; means for supplying a DC bias voltage to said transistor to operate the same in a certain condition of conductivity in the absence of the input pulse signal; load means connected between the second electrode of said transistor and a power source of the transistor, said load means comprising first and second parts; means connected to the third electrode of said transistor to be charged and discharged by a current flowing in said transistor; circuit means comprising switching means and a constant voltage source, said circuit means being connected between two parts of said load means, and said switching means being operated in response to the condition of conductivity of the transistor; and means for picking up an output signal from said load means.

2. A pulse producing circuit as claimed in claim 1 wherein said load means comprises first and second resistors. 13

3. A pulse producing circuit as claimed in claim 1 wherein said charged and discharged means comprises a resistor and a capacitor connected in parallel to each other.

4. A pulse producing circuit as claimed in claim 1 wherein said first, second and third electrodes of the transistor are a base, a collector and an emitter, respectively.

5. A pulse producing circuit as claimed in claim 1 wherein said circuit means comprises a second transistor supplied with a fixed DC bias voltage to the base, the collector and emitter of said second transistor being respectively connected to the power source and said load means.

6. A pulse producing circuit as claimed in claim 5 wherein said second transistor is of the same condition of conductivity type as said first-named transistor.

7. In a signal gating circuit including pulse producing means for producing a gate pulse signal and gate means for gating a part of a signal supplied thereto, said pulse producing means comprising a transistor having a first, second and third electrode; means for supplying an input pulse signal to the first electrode of said transistor; means for supplying a DC bias voltage to said transistor to operate the same in a predetermined condition of conductivity in the absence of the input pulse signal; load means comprising two parts connected between the second electrode of said transistor and a power source; means connected to the third electrode of said transistor to be charged and discharged in response to current flowing in said transistor; circuit means operative as a series circuit and comprising switching means and a constant voltage source, said circuit means being connected between two parts of said load means and said switch being operated in response to the condition of conductivity of said transistor; and means for picking up an output signal from said load means, said switching means being operated in response to the condition of said transistor.

8. A signal gating circuit as claimed in claim 7 wherein said load means comprises a pair of series-connected resistors.

9. A signal gating circuit as claimed in claim 7 wherein said charged and discharged means comprises a resistor and a capacitor connected in parallel to each other.

10. A signal gating circuit as claimed in claim 7 wherein said first, second and third electrodes of the transistor are a base, a collector and an emitter, respectively.

11. A signal gating circuit as claimed in claim 7 wherein said circuit means comprises a second transistor supplied with a fixed DC bias voltage to its base, the collector and emitter of said second transistor being respectively connected to the power source and said load means.

12. A signal gating circuit as claimed in claim 11 wherein said second transistor is of the same condition of conductivity as said first-named transistor.

13. A signal gating circuit as claimed in claim 7 wherein said gate means comprises an additional transistor supplied with the signal to be gated; a diode connected between said additional transistor and said pulse producing means; and means for deriving a gated signal from the connection point between said diode and pulse producing means.

14. A signal gating circuit as claimed in claim 13 wherein said diode is operated with the gate pulse signal from said pulse producing means.

15. A signal gating circuit as claimed in claim 14 wherein said diode remains in its non-conducting condition in the absence of the gate pulse signal.

16. A signal gating circuit as claimed in claim 13 wherein said gated signal comprises a predetermined frequency and said gated signal deriving means comprises a third transistor connected to a resonant circuit tuned to said predetermined frequency, said third transistor being connected to the connection point between said diode and pulse producing means.

* * * * *